United States Patent

Luo

[11] Patent Number: 5,927,441
[45] Date of Patent: Jul. 27, 1999

[54] BRAKING DEVICE FOR TROLLEY

[76] Inventor: Chung-I Luo, 9F,No. 108,Kuan-Chian E.Rd., Pan-Chiao City, Taipei Hsien, Taiwan

[21] Appl. No.: 08/935,735

[22] Filed: Sep. 23, 1997

[51] Int. Cl.⁶ .................................................. B62B 5/04
[52] U.S. Cl. ........................... 188/19; 188/20; 188/22; 74/489; 74/502.2; 74/527
[58] Field of Search .................... 188/22, 20, 19, 188/24.18; 74/488, 489, 502.2, 523, 526, 527

[56] References Cited

U.S. PATENT DOCUMENTS

| | | | |
|---|---|---|---|
| 4,618,033 | 10/1986 | Kassai | 188/20 |
| 5,090,517 | 2/1992 | Doughty | 188/19 |
| 5,279,180 | 1/1994 | Henriksson | 74/502.2 |
| 5,524,731 | 6/1996 | Grieg | 188/19 |

*Primary Examiner*—Robert J. Oberleitner
*Assistant Examiner*—Mariano Sy
*Attorney, Agent, or Firm*—Bacon & Thomas, PLLC

[57] ABSTRACT

A device for trolley of the type which is provided with four mounting brackets and each of which is mounted with a caster socket. Each caster socket is rotationally mounted with a caster. The trolley frame is further provided with a pair of hand grips at both sides for moving the trolley forward by exerting a forward force to the trolley through the hand grips. The braking device is mounted at the hand grip and includes a housing which is attached to the hand grip. A pulling rod is pivotally mounted at one end of the housing A cable is connected to the other end of the pulling rod. The pulling rod is provided with a first recess, a second recess and a boss. The housing is pivotally mounted with a braking handle which is provided with a biasing tab and a positioning tab.

1 Claim, 6 Drawing Sheets

BRAKING DEVICE FOR TROLLEY

FIELD OF THE INVENTION

The present invention relates to a braking device, more particularly, to a braking device for a trolley or the likes. The trolley used herein generally covers but is not limited to an auxiliary walker, basket trolley or baby gear. By the provision of the braking device, the trolley can be readily stopped in time.

DESCRIPTION OF PRIOR ART

The trolley is a carrier which has been provided with wheels under the chassis or frame. The articles can be loaded onto the chassis or frame for moving from one place to another. However, as the trolley is moved, an inertia is also generated accordingly. If the operator hopes to stop the trolley, he/she needs to pull back the trolley to counter the forward inertia of the trolley. As the trolley is loaded with articles, it becomes more and more difficult for the operator to stop the trolley.

On the other hand, the elder people and/or the people who suffer from a feet or leg injury may need a walker for help. The walker is provided with a pair of wheels which make the device easier to manipulate. The user can be well supported and prevented from falling down by this walker during his/her walk. In the early stage, the walker has a rectangular fame and the user shall lift and put the walker ahead before his/her next step. However, lifting up the walker and putting it ahead is extremely difficult for weak people. Accordingly, those weak people can not receive help from the rectangular walker.. On the other hand, the conventional rectangular walker has four legs and the walker will become unstable when only two legs stand on the floor. In his situation, the user may readily fall down if he/she rests all weight on the walker.

In order to make the walker easier to manipulate, the four legs of the walker are provided with casters. However, while the walker is easy to move, the user shall be more cautious to pace it. As a matter of fact, even this walker having casters becomes easier to move, so when the user places all his/her weight on it, and the center of gravity is moved toward the walker and away from the user, the walker will slip away and the user may fall down because of loss of support. In light of this, there is still room for improving the walker.

On the other hand, the children gear is also provided with wheels for easy moving. However, when the children gear is stopped on a slope, it may slip downward. In order to stop the children gear, the rear wheels are mounted with a braking lever. When the braking lever is triggered, the rear wheels can be braked and the children gear can be stopped firmly even on a slope. However, the braking lever is mounted at a side of the wheel and which must be stepped down upon the braking lever. On the other hand, the braking lever can only be released manually with hand. In doing this, the user needs to bend down. This is really inconvenient to the user.

SUMMARY OF THE INVENTION

It is the objective of this invention to provide a braking device which can be readily mounted on a trolley for different applications. By providing a braking device to the trolley, the trolley can be readily stopped by simply manipulating the braking handle.

According to another aspect of the present invention, the braking handle can be disposed at a position such that the braking effect can be kept continuously until the braking handle is resumed to its original position.

In order to achieve the objective set forth, the braking device includes a braking assembly which is fixedly mounted onto the hand grip of the trolley and includes a housing in which a pulling rod and a braking handle is pivotally mounted therein The caster socket is rotationally mounted with a braking lever. And a spring member is anchored at the pivoting point of the caster socket and the braking lever. One end of said braking lever is provided with a braking shoe at the lower portion and the other end of said braking lever is connected to the braking assembly by means of a cable. Wherein when said braking assembly is triggered, said braking lever is also triggered by said cable such that said braking shoe is pressed against said caster to stop it. When the braking handle is released, the caster is also released from the braking effect of the braking shoe for free rotation. By this arrangement, the trolley can be readily and conveniently braked during the forward movement of the trolley. In case the braking device is mounted onto the walker, the walker can be readily stopped when the user steps forward, and the walker can be released to move when the user stands firmly. The accidentally falling down can be therefore avoided. In the case when the braking device is mounted onto the children gear, the children gear can be readily stopped on a slope by simply manipulating the braking handle. While the braking handle can be released and the children gear can be moved forward.

BRIEF DESCRIPTION OF THE DRAWINGS

In order that the present invention may more readily be understood the following description is given, merely by way of example with reference to the accompanying drawings, in which.

DETAILED DESCRIPTION OF PREFERRED EMBODIMENT

Figure 1:
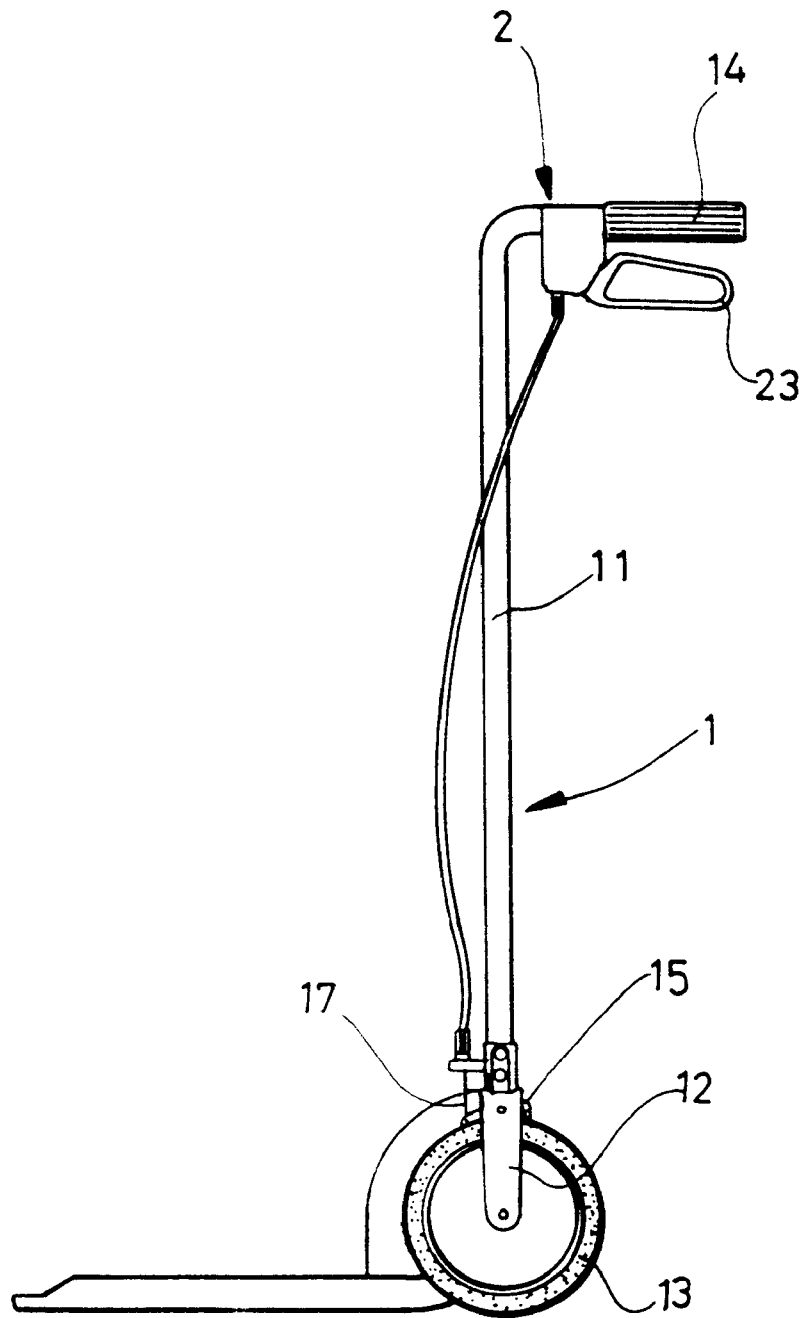
FIG. 1 is a perspective view of the braking device made according to the present invention.
Figure 2:
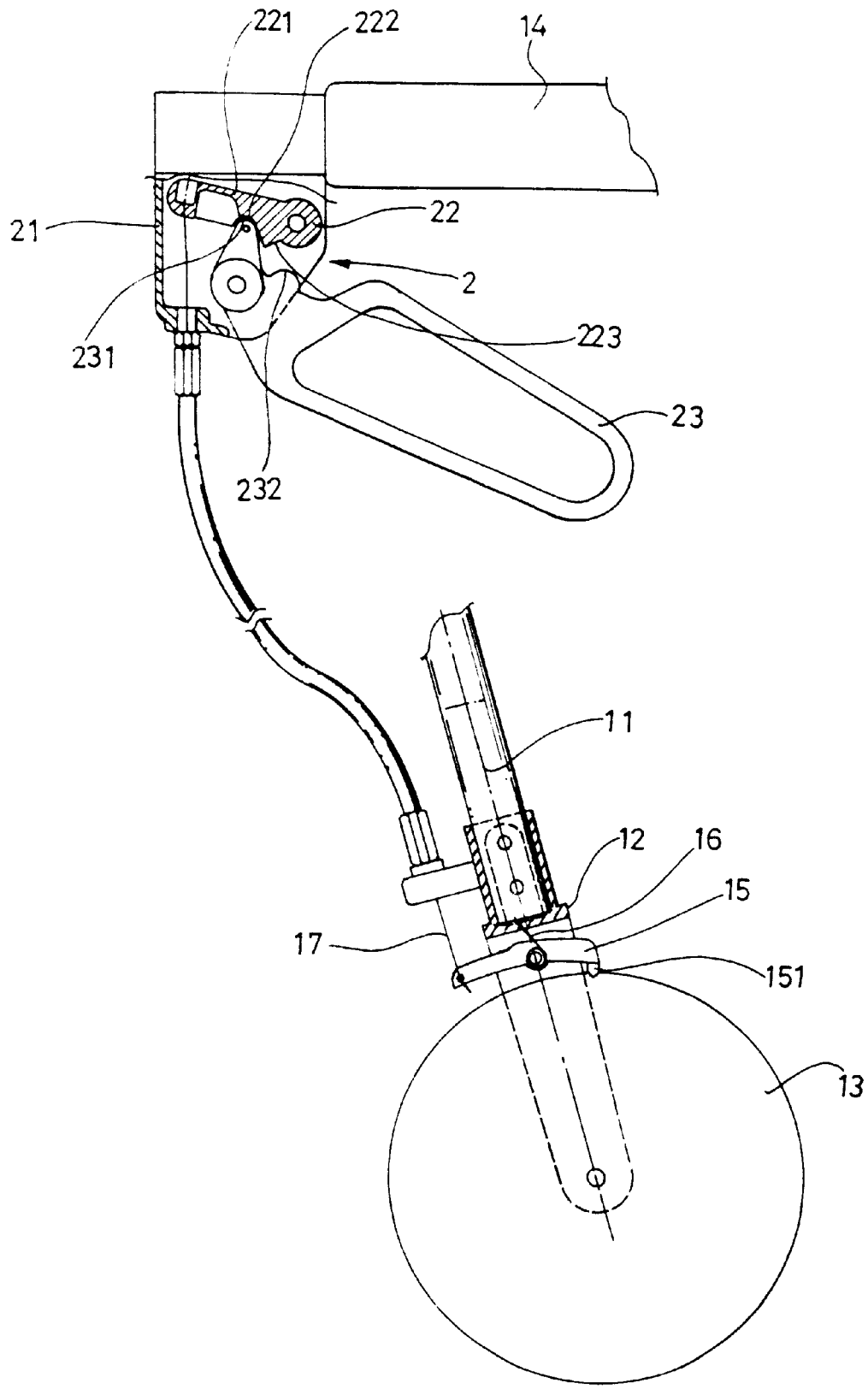
FIG. 2 is a schematic illustration showing the braking device is disposed at the first position.

Referring to FIG. 1, the frame I of a trolley is provided with four mounting brackets 11 and each of which is mounted with a caster socket 12 thereof Each caster socket 12 is then rotationally mounted with a caster 13. The frame 1 is further provided with a pair of hand grips 14 at both sides respectively. By this arrangement, the user may move the trolley forward by exerting a forward force to the trolley through the hand grips 14. The caster socket 12 is pivotally mounted with a braking lever 15 and a spring member 16 is anchored at the pivoting point of the caster socket 12 and the braking lever 15. One end of the braking lever 15 is provided with a braking shoe 151 at the lower portion. The other end of the braking lever 15 is connected to a braking assembly 2 by means of a cable 17. The braking assembly 2 is pivotally mounted to the hand grip 14 When the braking assembly 2 is triggered, the braking lever 15 is also triggered by the cable 17 such that the braking shoe 151 is pressed against to the caster 13 to stop it.

The braking assembly 2 includes a housing 21 which is fixedly attached to the hand grip 14. A pulling rod 22 is pivotally mounted at one end of the housing 21. The cable 17 is fixedly connected to the other end of the pulling rod 22. The pulling rod 22 is provided with a first recess 221, a second recess 222 and a boss 223. The housing 21 is pivotally mounted with a braking handle 23 which is provided with a biasing tab 231 and a positioning tab 232.

By this arrangement when the braking handle 23 is pushed downward, the biasing tab 231 will be engaged in the second recess 222 of the pulling rod 22 such that the pulling rod 22 is pivoted upward and while the cable 17 is also pulled and the free end of the braking lever 15 is moved downward such that the braking shoe 151 is pressed against to the caster 13. As a result, the caster 13 is permanently braked.

Figure 3:
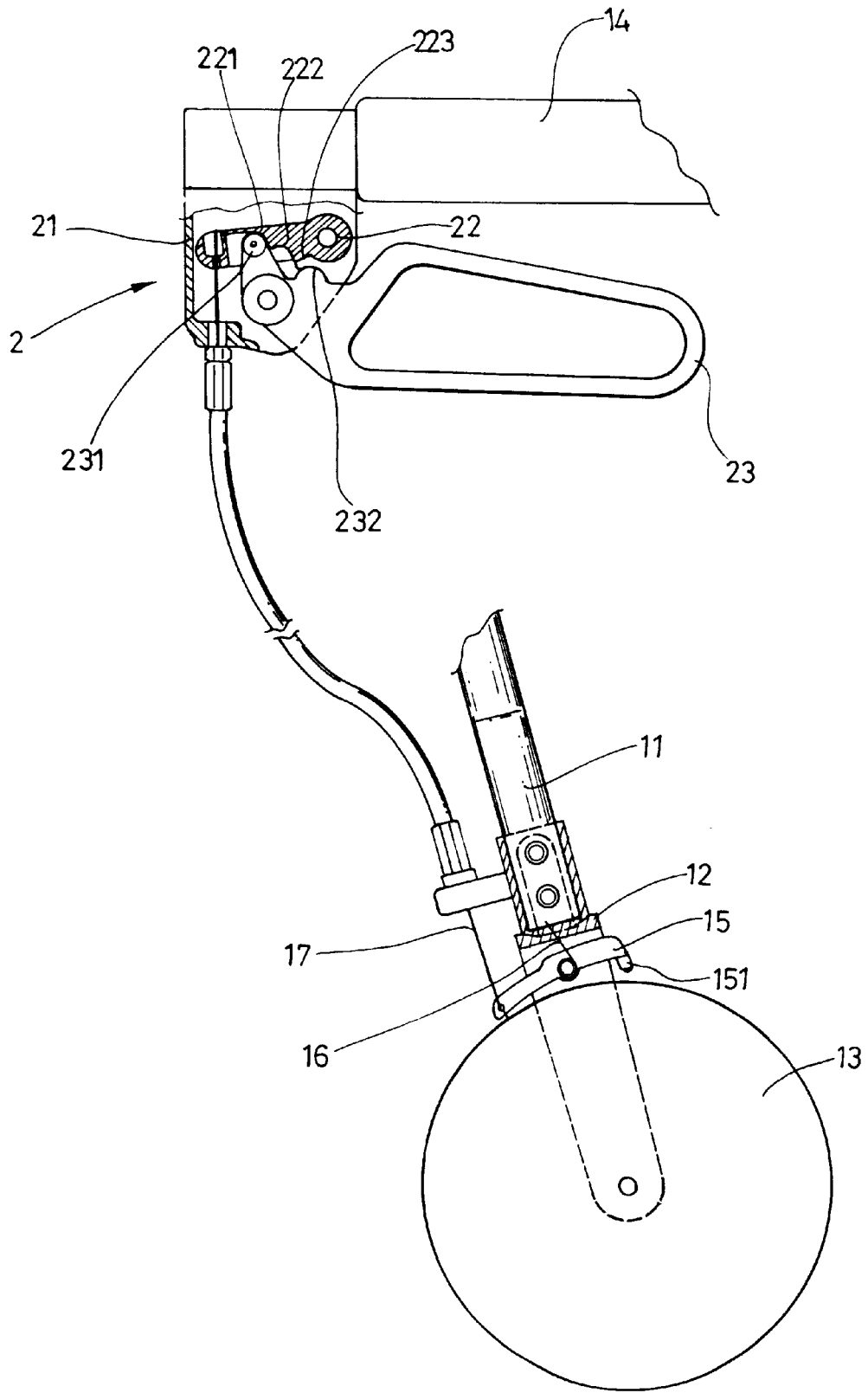
FIG. 3 is a schematic illustration showing the braking device disposed at the second position.

When the trolley is to move, the braking handle 23 can be lifted and moved to the middle position such that the biasing tab 231 of the braking handle 23 is engaged in the first recess 221 of the pulling rod 21. As a result, the pulling rod 22 is pivoted downward to release the cable 17. The braking lever 15 is also released and is resumed to a neutralized position by the retracting force of the spring 16, accordingly, the caster 13 is also released for free rotation. Then the user may move the trolley 1 forward, as shown in FIG. 3.

Figure 4:
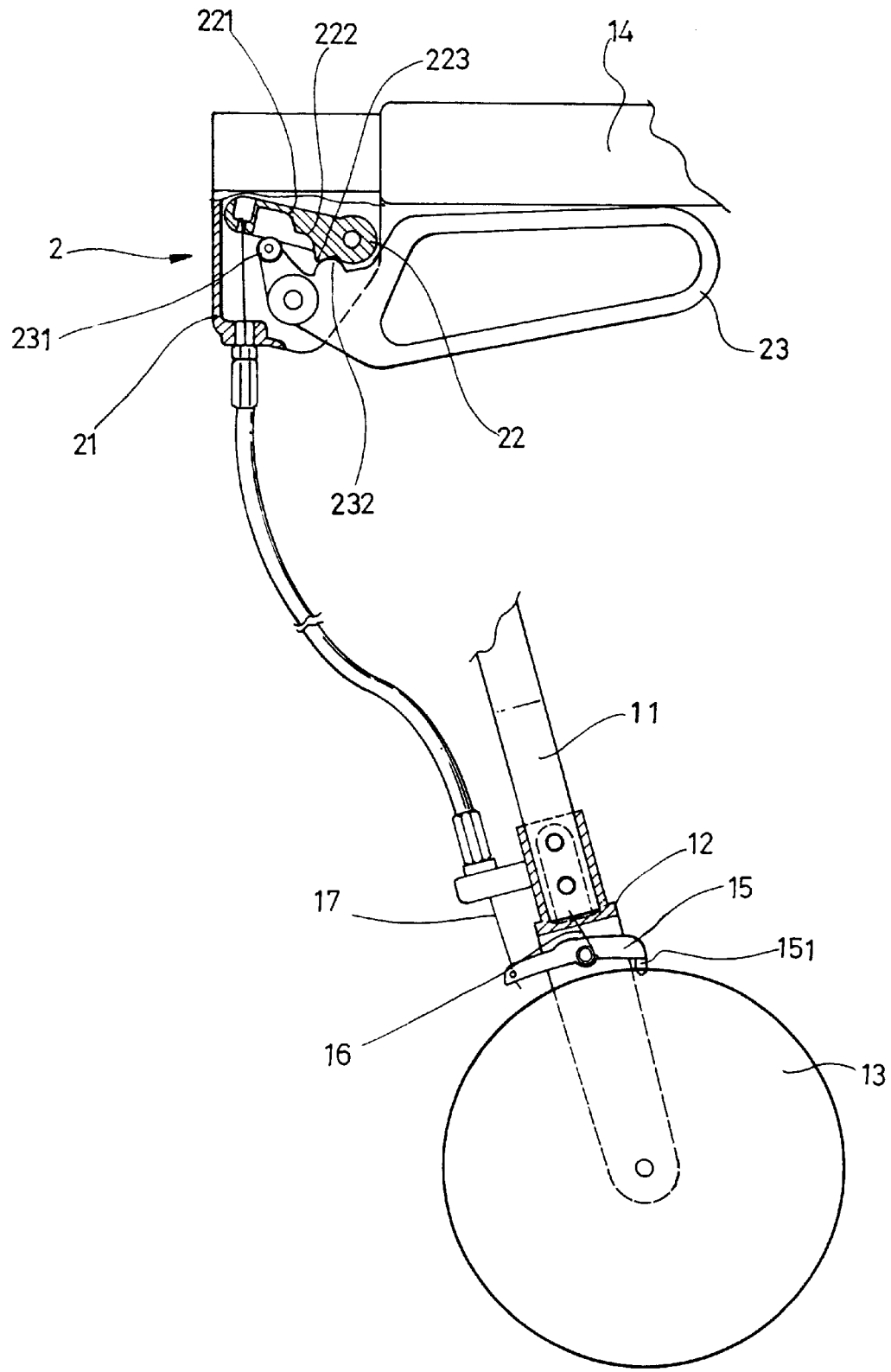
FIG. 4 is a schematic illustration showing the braking device disposed at the third position.

In case an immediate braking movement is required during the movement of the trolley, the braking handle 23 can be lifted upward to its upper limit such that the positioning tab 232 of the braking handle 23 is pressed against to the boss 223 of the pulling rod 22. Accordingly, the pulling rod 22 is pivoted upward and the cable 17 is pulled to trigger the braking lever 15 downward such that the braking shoe 151 is pressed against the caster 13 to stop it, as clearly shown in FIG. 4. While the braking handle 23 is released, the braking handle 23 will resume its original position such that the biasing tab 231 of the braking handle 23 is engaged in the first recess 221 of the pulling rod 22. As a result, the braking movement is neutralized and the caster 13 is free to move, as shown in FIG. 3.

Since the trolley is provided with the braking device, it can be immediately stopped by triggering the braking device. As a result, the user does not need to apply a reverse force to stop the trolley. Furthermore, the trolley frame 1 can be permanently stopped for loading or unloading an article.

Figure 5:
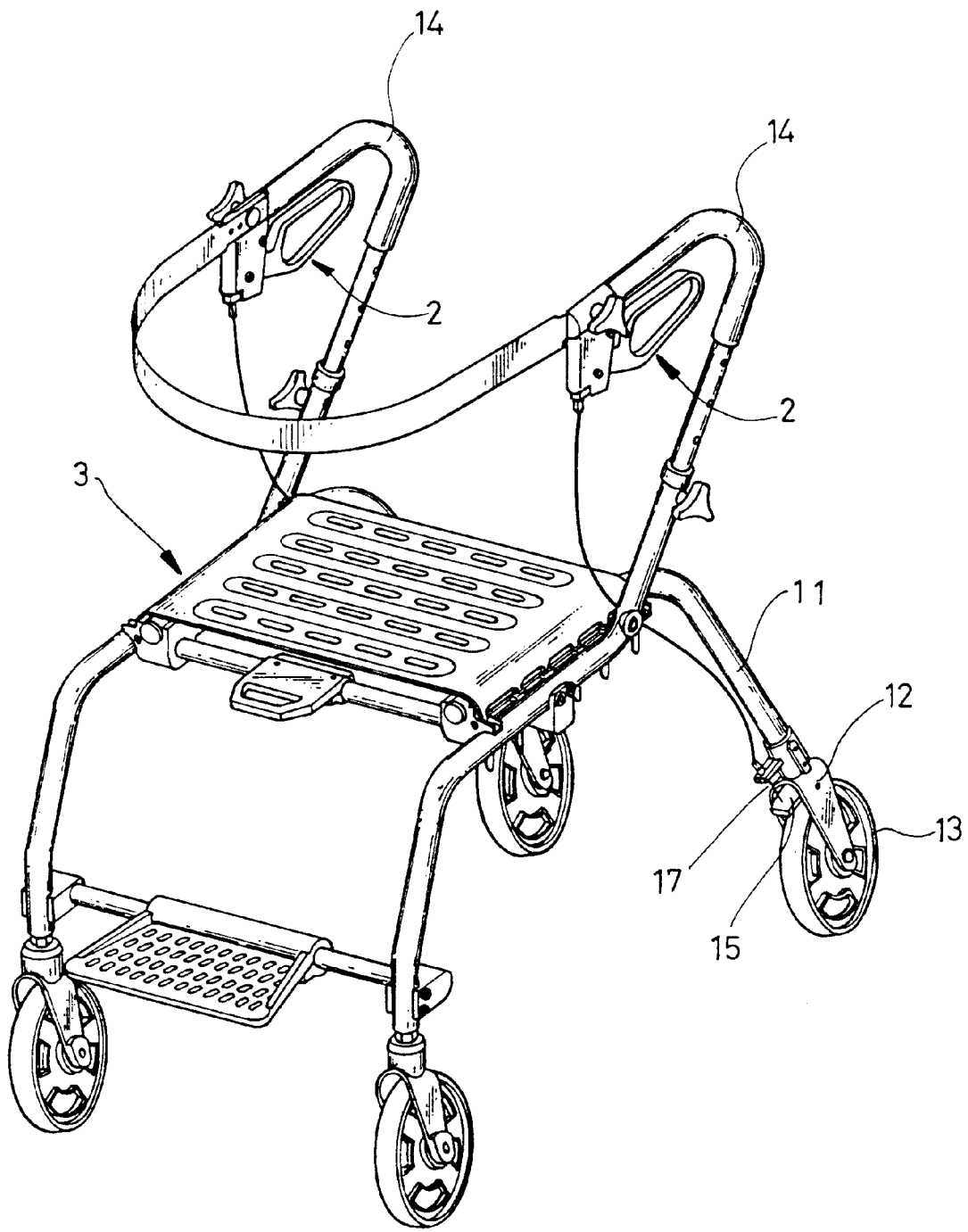
FIG. 5 is a schematic illustration showing an auxiliary walker is incorporated with the braking device.

Furthermore, as shown in FIG. 5, the braking device made according to the present invention can be incorporated onto an auxiliary walker 3 having rolling casters 13. Since the auxiliary walker 3 is provided with a braking device, it can be immediately stopped when the braking handle 23 is pulled upward to its upper limit. As the walker 3 can be stopped in time, the user can be prevented from falling off due to any continued forward movement of the walker 3. When the braking handle 23 is released, the caster 13 is again released for free rotation and the walker 3 can be moved forward. By this arrangement, the walker can be operated in a more safe condition.

Figure 6:
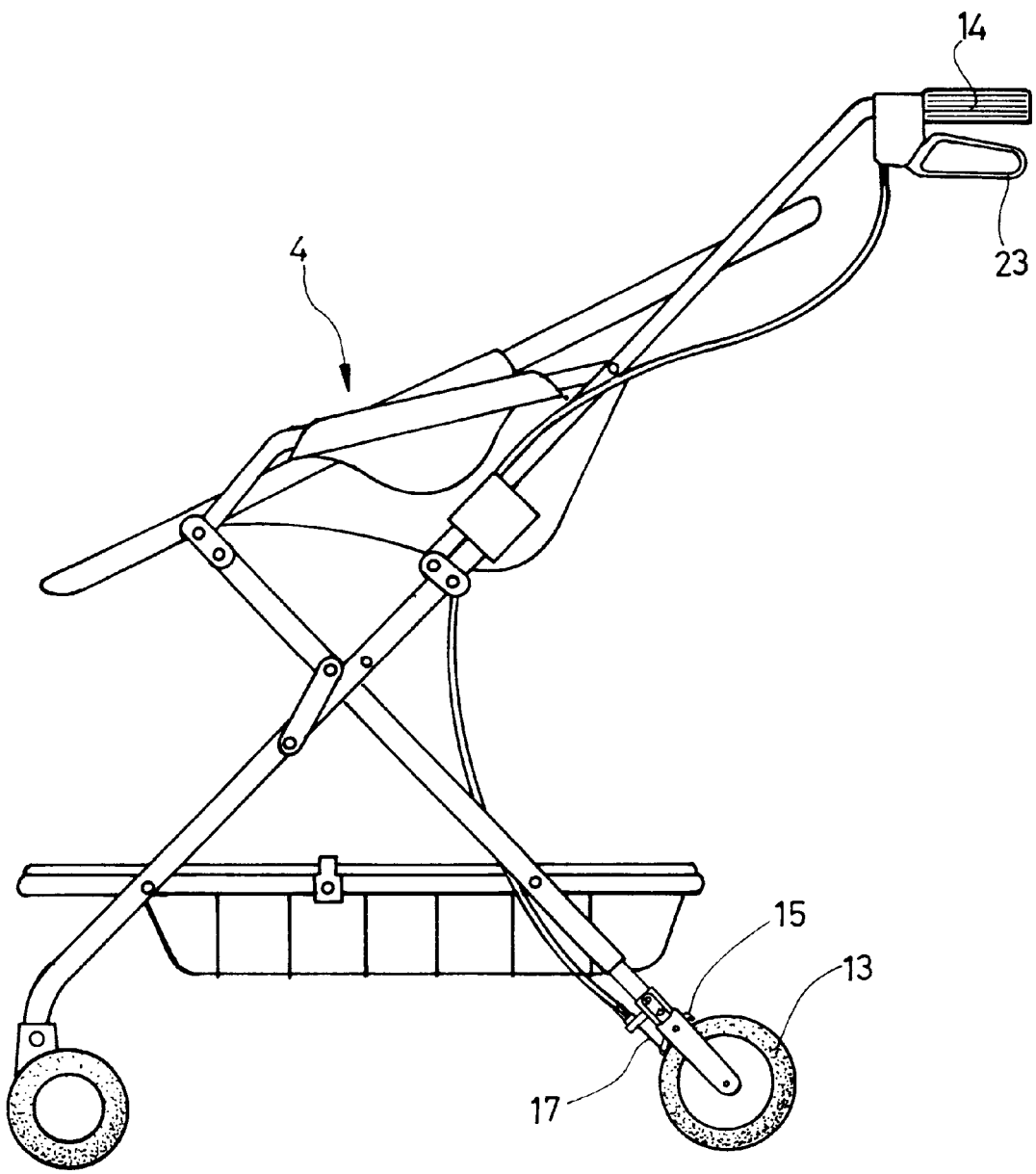
FIG. 6 is a schematic illustration showing a baby gear incorporated with the braking device.

In case the braking device is incorporated in a children gear 4, as shown in FIG. 6, the children gear 4 can be also stopped immediately by operating the braking handle 23 which is located on the hand grip 14. As a result, the user does not need to trigger the conventional braking lever of the children gear 4. Conventionally, the braking lever is stepped downward to press against the caster 13. This is quite inconvenient to the user. By the provision of the present invention, the children gear can be conveniently stopped by simply manipulating the braking handle. Furthermore, a bed having caster can also be incorporated with the braking device made according to the present invention.

We claim:

1. A braking device for a trolley having a frame provided with four mounting brackets, each of which includes a caster socket, each of said caster socket being rotationally mounted with a caster, said trolley frame is further provided with a pair of hand grips at both sides, respectively, for moving said trolley forward by exerting a forward force to said trolley through said hand grips, said caster socket being pivotally mounted with a braking lever and a spring member being anchored at the pivoting point of said caster socket and said braking lever, one end of said braking lever being provided with a braking shoe at a lower portion, the other end of said braking lever being connected to a braking assembly by means of a cable, said braking assembly being fixedly mounted to said hand grip, wherein when said braking assembly is triggered, said braking lever is also triggered by said cable such that said braking shoe is pressed against said caster to stop it, the device comprising:

said braking assembly includes a housing which is fixedly attached to said hand grip, a pulling rod being pivotally mounted at one end of said housing, said cable being fixedly connected to the other end of said pulling rod, said pulling rod being provided with a first recess, a second recess and a boss, said housing being pivotally mounted with a braking handle which is provided with a biasing tab and a positioning tab, wherein when said braking handle is pushed downward such that said biasing tab will be engaged in said second recess, or said positioning tab of said braking handle may press against said boss of said pulling rod such that said pulling rod is pivoted upward and while said cable is also pulled and the free end of said braking lever is moved downward to bias said braking shoe against said caster to brake same, and wherein when said biasing tab of said braking handle is engaged in said first recess of said pulling rod, said cable is released and said caster is also released from said braking shoe of said braking lever for free rotation.-Please cancel claim 2 without prejudice or disclaimer.

* * * * *